United States Patent [19]

Koch et al.

[11] Patent Number: 4,465,603
[45] Date of Patent: Aug. 14, 1984

[54] PROCESS FOR PRODUCING SUPERBASIC DETERGENTS FOR LUBRICANT COMPOSITIONS

[75] Inventors: Paolo Koch, S. Giuliano Milanese; Alberto Santambrogio, Corsico, both of Italy

[73] Assignee: Agip Petroli S.p.A., Rome, Italy

[21] Appl. No.: 445,742

[22] Filed: Nov. 30, 1982

[30] Foreign Application Priority Data

Dec. 3, 1981 [IT] Italy ................................ 25425 A/81

[51] Int. Cl.$^3$ .............................................. C10M 1/40
[52] U.S. Cl. ................................. 252/33.4; 252/40.5; 252/42
[58] Field of Search ................. 252/33, 38, 33.4, 40.5, 252/42, 33.3

[56] References Cited

U.S. PATENT DOCUMENTS 4,059,536 11/1977 Lallement et al. ................. 252/33.3
4,065,396 12/1977 Dickey et al. ........................ 252/33

Primary Examiner—Jacqueline V. Howard
Attorney, Agent, or Firm—Hedman, Gibson, Costigan & Hoare

[57] ABSTRACT

The process for the production of superbasic detergents from sulphonates and/or sulphophenates and an oxide or an hydroxide of an alkali metal or an alkaline earth metal is carried out in the presence of an ester of the carbonic acid, preferably in the presence of dimethylcarbonate.

4 Claims, No Drawings

PROCESS FOR PRODUCING SUPERBASIC DETERGENTS FOR LUBRICANT COMPOSITIONS

In the lubricant compositions for internal combustion engines detergent additives are generally introduced to inhibit the formation of undesirable deposits, such as lacquers or carbon, in the throats and the segments (piston rings) which are liable to damage the engine.

Benzene sulphonates or sulphophenates are generally employed which are alkyl-substituted and are salified by alkali metals or alkaline earth metals. During the engine operation undesirable acidic organic and inorganic substances are formed ($HNO_3$, $H_2SO_4$, RCOOH and others) coming either from the partial combustion of the fuel or the oxidation of the lubricant and these must be neutralized to prevent their corrosive action on the metal component parts.

This result is obtained by introducing into the lubricant composition a strong inorganic base.

The means which is the most frequently used to achieve this result is to subject the detergent additive to a process to render it superbasic.

This process essentially comprises the step of preparing a slurry of an oxide (or an hydroxide) of an alkali metal or an alkaline earth metal in the detergent additive (salts of alkylbenzenesulphonic acids or salts of alkylphenols) in the presence of water, an alcohol or, optionally, a hydrocarbonaceous solvent.

Carbon dioxide is subsequently introduced so as to convert the oxide or the hydroxide in question into its corresponding carbonate. Water, the alcohol and the solvent, if any, are finally removed so that a stable colloidal dispersion of the inorganic carbonate within the additive is obtained.

The objective of the instant process is not, obviously, that of preparing a carbonate from an oxide, or a hydroxide, and $CO_2$, but, rather, that of obtaining a stable colloidal dispersion in the additive, said dispersion being soluble in the lubricant bases.

To attain this objective is not an easy task: as a matter of fact, if the process is not carried out with all the necessary expedients, coagulation of the colloid may occur with an attendant gel formation.

Many a patents claim improvements in the properties of the products obtained by such a process whenever it is carried out in the presence of substances which are defined as promoters, such as methanol (U.S. Pat. No. 3,956,018), ethylene glycol (U.S. Pat. No. 2,680,096 and U.S. Pat. No. 2,680,097), higher alcohols (U.S. Pat. No. 3,178,368), or co-promoters such as amines (U.S. Pat. No. 2,924,617), organic acids (U.S. Pat. No. 3,928,216), or co-solvents such as chlorobenzene or aromatic and aliphatic hydrocarbons.

Other patents claim improvements of the properties of the superbasic products (solubility in oils, low viscosity, filterability) on the basis, for example, of the magnesium or calcium oxides to be employed: commercial grade magnesium oxide (U.S. Pat. No. 3,865,737) active grade magnesium oxide (U.S. Pat. No. 4,192,758) light magnesium oxide (U.S. Pat. No. 3,629,109), heavy magnesium oxide (U.S. Pat. No. 3,928,216), calcium oxide having a medium reactivity towards water (U.S. Pat. No. 4,086,170).

The present applicants have now found that superbasic detergents can be produced without using any promoters, co-promoters, co-solvents and irrespective of the kind of oxide and hydroxide employed, by merely carrying out the process for rendering the detergent superbasic, benzene sulphonate and/or sulphophenate, with an oxide or a hydroxide of an alkali metal or an alkaline earth metal in the presence of an ester of the carbonic acid, preferably an alkyl ester, and, still more particularly dimethylcarbonate.

The process according to the present invention, while adopting a reactant which is more expensive than $CO_2$, affords the following considerable advantages over the processes reported by the literature.

Inasmuch as the reaction is extremely selective in forming the inorganic carbonate in such a form as to be completely solubilized within the organic phase, it is possible to limit the quantity of the carbonic acid ester and those of the oxide or the hydroxide of the alkali metal or the alkaline earth metal to what is strictly necessary to produce the desired degree of superbasicity in the additive. This circumstance also entails a drastic reduction of the inorganic solic residue which is to be removed by filtration or centrifugation from the end product.

It becomes possible to dispense with using promoters, co-promoters, solvents, with a considerable saving and a better exploitation of the potential output of the installation, while dispensing also with the recovery of such substances by distillation once the reaction is completed.

As a rule, low temperatures are adopted and short times, so that a considerable saving of power is achieved.

It is possible to obtain superbasic and hyperbasic detergents starting from alkylbenzenesulphonic acids and/or from alkylsulphophenols by a single step without modifying the working conditions of the installation consistently with the products fed into the installation itself.

Products having the desired degree of basicity can be obtained without having to face problems as to filtration, solubility and viscosity of the end additive.

Any kind of oxide or hydroxide of alkali metals or alkaline earth metals can be used.

On completion of the reaction the alcohol, of which the carbonic acid ester is a derivative, is quantitatively recovered.

The process according to the present invention is generally performed in two steps, but it can be carried out, with advantage, in a single step if so desired.

The benzenesulphonic acid, or the alkyl-substituted sulphophenol is generally diluted in a mineral oil and converted into a neutral salt by adding thereto an oxide or a hydroxide of an alkali metal or an alkaline earth metal, and the 2% to 10% by weight of methanol relative to the additive, the reaction mixture being heated to 80° C.–90° C. until the acid has completely been salified, whereupon methanol and the salification water are distilled off.

The neutral salts, that is, benzene sulphonates and/or sulphophenates are rendered superbasic by adding thereto a quantity of an oxide or a hydroxide of an alkali metal or an alkaline earth metal and dialkyl carbonate in equimolecular amounts so as to have in the final additive the desired degree of superbasicity, the mixture is heated to 70° C. while adding small amounts of water 0.1% to 10% relative to dimethylcarbonate. Finally, the alcohol of which the carbonic acid ester is a derivative is distilled off and one obtains, by filtration, the desired product.

As an alternative, once could dispense with distilling off in the salification stage methanol and water so as to avoid the necessity of adding water during the stage of superbasic-making.

All the working details will be clearly appreciated in the following illustrative examples which should not be construed as limitations to the instant invention.

EXAMPLE 1

A glass reactor is charged with 500 g of alkylbenzenesulphonic acid having a mol wt of 350 and an acid rating of 70%, 500 g of a paraffinic mineral oil having a viscosity of 5.5 cSt at 100° C., and 55 g of calcium hydroxide with 100 mls methanol.

The mixture is stirred while the temperature rises spontaneously. After 15 minutes, the mixture is heated to 65° C. until refluxing methanol and this conditions is maintained for 30 minutes. By gradually raising the temperature to 120° C. methanol and the salification water are distilled off. The contents of the reactor is cooled to 70° C. and there are added 260 g of calcium hydroxide, 315 g of dimethylcarbonate and 3 mls of water. After 5 minutes a plentiful reflux of methanol in the condenser is experienced. The temperatures of 70° C. is maintained under these conditions for 30 minutes. Methanol is then distilled off and the last traces of methanol are driven off by heating to 100° C. and blowing an air-stream into the reactor for 15 minutes. There are recovered 215 g of methanol. The product is filtered after having added 20 g of an adjuvant. There are obtained 1250 g of a product which shows at the InfraRed analysis the characteristic band due to the superbasic character at 860 cm$^{-1}$ and has a TBN (total base number) of 360 mg KOH/g.

EXAMPLE 2

A glass reactor is charged with 500 g of dodecylsulphophenol as obtained by reacting in a molar ratio of 2 to 1 dodecylphenol and sulphur monochloride, 500 g of a paraffinic mineral oil having a viscosity of 5.5 cSt at 100° C., 230 g of slaked lime and 100 mls of methanol. The mixture is heated with stirring to 68° C. thus refluxing methanol during 60 minutes. On completion of the salification which took place in the reactor which also contains the salification water, there are introduced into the reactor through a charging funnel and during 30 minutes 200 g of dimethyl carbonate.

During the entire addition, the temperature is maintained at 68° C. while concurrently distilling off the methanol which has been formed. The temperature is then gradually brought to 120° C. to remove the salification water and the last traces of methanol. There are added 20 g of an adjuvant and the mixture is filtered. There are obtained 1100 g of a product having a viscosity of 170 cSt at 100° C. and a TBN (total base number) of 250 mg KOH/g.

EXAMPLE 3

A glass reactor is charged with 500 g of dodecylsulphophenol as obtained by sulphuretting dodecylphenol with sulphur in a molar ratio of 1:1 in the presence of 3% of NaOH, 500 g of a paraffinic mineral oil having a viscosity of 5.5 cSt at 100° C., 50 g of calcium oxide and 100 mls of ethanol. The mixture is heated to 68° C. during 60 minutes and, on completion of the salification the methanol and the salification water are distilled off by heating the mixture gradually up to 120° C. The mixture is now cooled to 60° C., there are added 130 g of calcium oxide, 210 g of dimethyl carbonate and 10 mls of water. The mixture is heated to 68° C. and the distilled off methanol is collected: in 30 minutes, 145 g of methanol are collected. The temperature is raised to 100° C. so as to remove methanol completely. There are added 20 g of an adjuvant and the mixture is filtered. There are obtained 1090 g of a product having a viscosity of 150 cSt at 100° C. and a TBN of 257 mgKOH/g.

EXAMPLE 4

A glass reactor is charged with 500 g of alkylbenzenesulphonic acid having a mol wt of 350 and an acid rating of 70%, 500 g of a mineral paraffinic oil having a viscosity of 5.5 cSt at 100° C., 40 g of NaOH and 100 mls of methanol. The mixture is stirred while the temperature rises to 50° C. spontaneously.

After 15 minutes the mixture is heated to 65° C. until obtaining the reflux of methanol and these conditions are maintained for 30 minutes. By gradually raising the temperature to 120° C. both methanol and the salification water are distilled off. The content of the reactor is cooled to 70° C. and there are added 200 g of NaOH flakes, 300 g of dimethylcarbonate and 1 ml of water.

Methanol is distilled off at the start, and is removed from the reactor. The distillation is continued for 60 minutes while maintaining the temperature at 70° C. The product is filtered after having added 20 g of an adjuvant thereto.

There are obtained 1200 g of a product which shows the characteristic InfraRed band at 860 cm$^{-1}$, has a TBN (totale base number) of 200 mgKOH/g and a viscosity of 31.4 cSt at 100° C.

We claim:

1. A process for the production of superbasic detergents from the group consisting of sulphonates, sulphophenates and mixtures thereof, said process comprising the step of reacting the sulphonate, sulphophenate or a mixture thereof with a hydroxide, or an oxide of an alkali metal or alkaline earth metal in the presence of an ester of carbonic acid.

2. Process according to claim 1, characterized in that said ester of the carbonic acid is dimethyl carbonate.

3. A process for the production of superbasic detergents from sulphonates, said process comprising the step of reacting a sulphonate with a hydroxide of an alkaline earth metal in the presence of dimethyl carbonate.

4. A process for the production of superbasic detergents from sulphophenates, said process comprising the step of reacting a sulphophenate with an oxide of an alkaline earth metal in the presence of dimethyl carbonate.

* * * * *